United States Patent
Suprunov

(10) Patent No.: US 6,405,030 B1
(45) Date of Patent: Jun. 11, 2002

(54) SYSTEM FOR INTERCEPTION OF DIGITAL CELLULAR PHONE COMMUNICATION

(75) Inventor: Peter Suprunov, 2 De Hart Ct., East Brunswick, NJ (US) 08816

(73) Assignee: Peter Suprunov, East Brunswick, NJ (US)

( * ) Notice: Subject to any disclaimer, the term of this patent is extended or adjusted under 35 U.S.C. 154(b) by 0 days.

(21) Appl. No.: 09/315,749

(22) Filed: May 20, 1999

(51) Int. Cl.[7] .................................................. H04M 3/00
(52) U.S. Cl. ....................... 455/410; 455/211; 455/213; 455/417
(58) Field of Search ................................. 455/419, 410, 455/411, 412, 414, 424, 560, 418, 416, 417, 420; 379/201, 202, 210, 211, 213, 34, 35

(56) References Cited

U.S. PATENT DOCUMENTS

| 5,603,084 A | * | 2/1997 | Henry, Jr. et al. | 455/33.1 |
| 5,887,253 A | * | 3/1999 | O'Neil et al. | 455/418 |
| 5,913,161 A | * | 6/1999 | Ozulkulu et al. | 455/405 |
| 6,014,561 A | * | 6/1999 | Molne | 455/419 |
| 5,923,744 A | * | 7/1999 | Cheng | 379/207 |
| 5,887,249 A | * | 10/1999 | Schmid | 455/411 |
| 5,937,345 A | * | 10/1999 | McGowan et al. | 455/410 |
| 6,049,712 A | * | 4/2000 | Wallinder | 455/414 |
| 6,097,798 A | * | 8/2000 | Albers et al. | 379/114 |
| 6,122,499 A | * | 9/2000 | Magnusson | 455/405 |

\* cited by examiner

Primary Examiner—William Trost
Assistant Examiner—Congvan Tran

(57) ABSTRACT

A system for interception of digital cellular phone communication which is required by Communication Assistance for Law Enforcement Agency CALEA. The system includes a plurality of wide area networks which control the transmission of voice, data, file and other types of messages in a reconfigured exchange area, each area network including a plurality of air interface Base Station (BS) controlled by a central regional service point Mobile Switch Center (MSC) which is connected to an activator unit. The activator is a computer based system controlled by microprocessor and having database for permanently and temporarily storing predetermined cellular phone subscribers information and messages from and intendant for selected end users. The activator communicates with other wide area network via a physical communication network which provides communication links between the networks and the end users whether wireless or wired.

20 Claims, 5 Drawing Sheets

SYSTEM FOR INTERCEPTION OF DIGITAL CELLULAR PHONE COMMUNICATION

FIELD OF THE INVENTION

This invention relates in general to wire or wireless communications networks, such as, digital cellular mobile radio system networks, and more particularly, to intercepting communications of cellular phone target users and routing the information to a dedicated phone number for monitoring the call.

BACKGROUND OF THE INVENTION

In order to present a complete example, a digital wireless network using cellular technology is described. The invention is not limited to wireless or cellular networks, but could be used in any network where the subscriber identity module (SIM) "smart card", or similar plug-in SIM provides the digital cellular telephone with an identity. The SIM is a smart card and has a computer and memory chip permanently installed in a plastic card the size of a credit card. The SIM has to be inserted into a reader in a digital cellular telephone before the mobile terminal can be used for its intended routine purposes. A small version of the SIM, called the plug-in SIM may be used for very small hand-portable phones. Certain subscriber information is stored on the SIM card, together with personal data used by a subscriber, such as personnel phone numbers. The SIM card operates to identify the subscriber to the network. Since only the SIM can personalize a phone, it is possible to travel abroad, taking only the SIM card, and rent a mobile phone at the destination.

One of the pieces of important information which identify a user is the international mobile subscriber number (IMSI) which is permanently stored on the SIM card.

Security Parameters and Authentication

An authentication procedure checks the validity of subscribers' SIM cards and permits the access to the cellular network. The authentication is based on an authentication algorithm, A3, which is stored on the SIM card. The A3 algorithm uses two parameters: one is the authentication key, Ki, which is stored only on the SIM card and the network. The second value, the randomly generated number (RAND), is transmitted by the mobile station over the air (i.e. via Um interface). Each call setup or registration uses different sets of RAND numbers. One important point of this security feature is that the relevant parameters A3 and Ki are stored in secured places and are never transmitted over the air.

To protect signaling and user data, digital cellular phone systems use a ciphering method, or ciphering algorithm, which is caller A5/1. The algorithms require a random generating specific key, Kc which is delivered from the network. This is the same number that was used for the authentication procedure. The only difference is that algorithm, A8, is used to produce the Kc. The designer of the ciphering aspects claim that this algorithm is so well protected against eavesdropping that even if someone knows the complete specifications, it is very difficult to intercept the information. This, of course, means that law enforcement agencies or other organizations which may need to listen in on private mobile phone conversation in the past, are no longer able to do so.

To protect users from possible intruders a temporary identity is assigned to all subscribers. This identity (TMSI) is stored along with the real identity (IMSI) in the network. The temporary identity is assigned during the location updating procedure, and is used as long as a subscriber remains active in the network. The mobile station uses TMSI to originate the call and the cellular network uses TMSI to page the mobile station. This means the mobile identity TMSI is changed every session of the mobile station, making it even more difficult to monitor digital cell communications.

SUMMARY OF THE INVENTION

It is an object of the instant invention to provide for law enforcement agencies a "digital wiretap" which is required by Communication Assistance for Law Enforcement Agency (CALEA).

It is also an object of the instant invention to offer a substantially fully meshed system comprising control networking having a plurality of activator devices and correspondent SIM card in the mobile station.

It is another object of the instant invention to provide "digital wiretap" for target mobile users and that operates completely independent of the polling, roaming schemes, and A3, A5, and A8 algorithms.

It is a further object of the instant invention to provide an activation/deactivation of target phone users by an activator apparatus that transmits short messages including subscriber ID and target phone numbers and that reaches out and finds the target phone.

It is yet another object of the instant invention to provide storing the short message with predetermined phone number/numbers in the SIM card that allows one to modify target phone calls as a "conference call".

It is yet further object of the instant invention to provide activation/deactivation of the target phone by using A-interface (off the switch) or Um- interface (off the air).

The objects of the instant invention are accomplished by a CALEA system comprising a short message which works in conjunction with existing physical mobile network. The short message of the instant invention works in conjunction with and is compatible with existing physical networks. The physical mobile networks is a regular networks provide the actual communication links between and users- cellular phone subscribers whether it be airlinks, or direct wireline links though MSC or PSTN or other communication connection system.

The Activator system (by using a subscriber data base) performs location, initiates communication (by sending a short message) links between Activator and target phone and activates or deactivates the target phone. A SIM card stores predetermined phone number/numbers in the memory. After that every incoming or outgoing call will be modified as a "conference call" with a predetermined phone number corresponding to a law enforcement listening room.

Thus, there is disclosed a system for interception of digital cellular phone communications which is required by Communication Assistance for Law Enforcement Agency CALEA. The system includes a plurality of wide area networks which control the transmission of voice, data, file and other types of messages in a reconfigured exchange area, each area network including at least one air interface Base Station (BS) controlled by a central regional service point Mobile Switch Center (MSC) which is connected to an Activator system. The Activator system is a computer based system controlled by a microprocessor and having a database for permanently and temporarily storing predetermined cellular phone subscriber information and messages from and intendant for selected end users. Activators communicate with each other and with other wide area network via a physical communication network which provides communication links between the networks and the end users, whether wireless or wired.

DETAILED DESCRIPTION OF THE INVENTION

Figure 1:
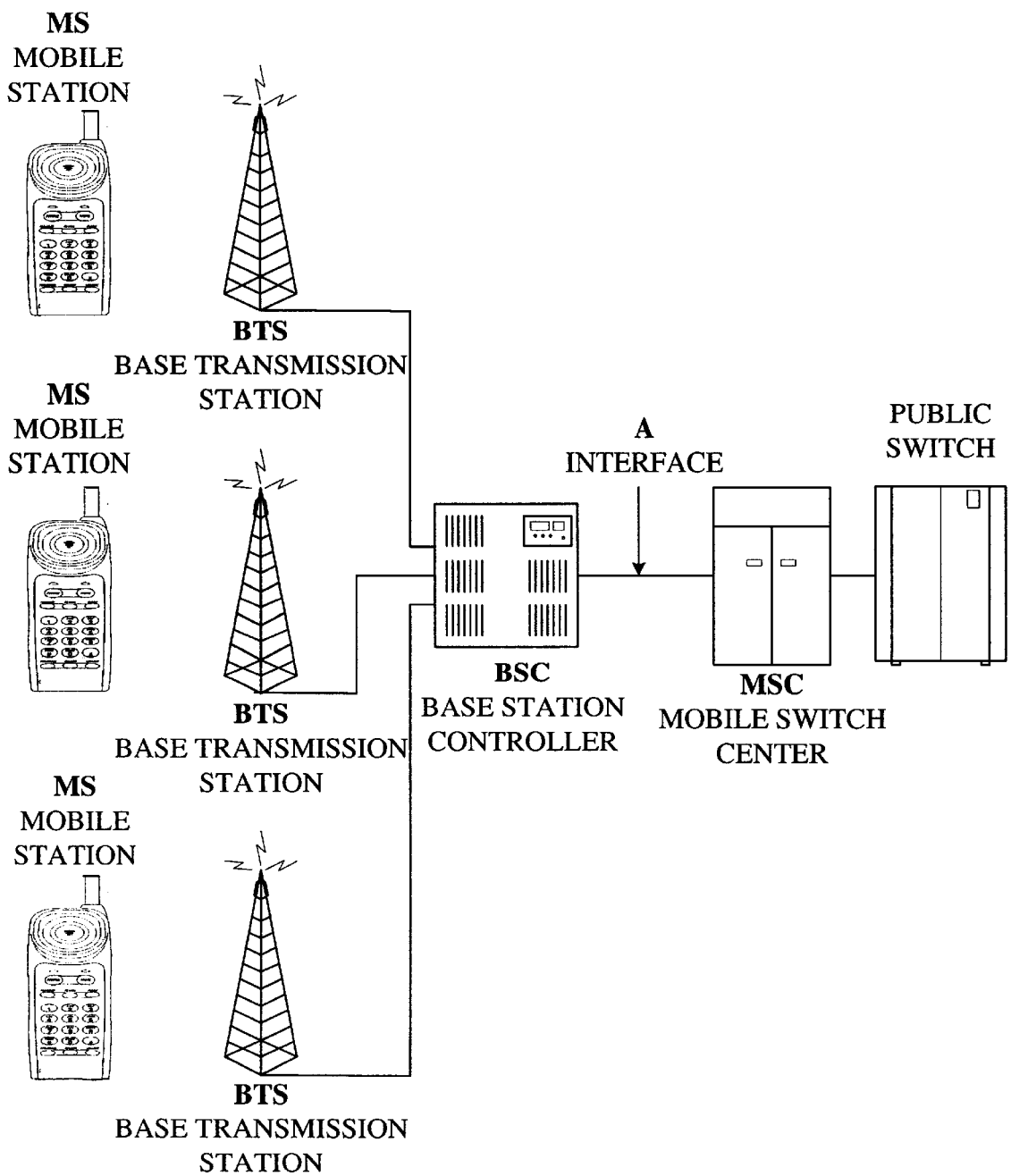
FIG. 1 is a system drawing of background digital cellular networks illustrating the division of communication cells and the controlling stations.

With reference to the drawings, FIGS. 2–5 illustrate a representative portion of the interception system comprising a plurality of peer wide area networks (WANs). The invention is applicable to any telecommunication radio network that allows mobile (wireless or wired) subscribers to communicate. FIG. 1 illustrates the background digital cellular telecommunication networks which comprise existing digital cellular telecommunication systems for establishing the actual physical airlinks, as well as the wire line communication links, between a remote cellular phone and either remote phones or wireline phones via transceivers in individual cells and wireline subscribers. The instant invention utilizes the physical digital cellular, radio or public switch network 8 (PSTN) (see FIG. 4) to locate and intercept communications between subscriber cellular phone 4 or cellular phones and wireline subscriber phone 9 (see FIG. 4). The interception system preferably provides a novel, digital network comprising a plurality of WANs and works in conjunction with the existing physical radio and digital cellular networks 1,2,3 for determining the cellular phone identification 5 and the location of the cellular phone user for routing Short Message to the target phone 4. Thus, the instant invention employs a novel, digital network as shown in FIGS. 2–5 that performs the legwork in establishing telecommunication links, correlating target cellular phone numbers with the actual target phone and target phone user, and routing the Short Message to activate or deactivate the interception procedure.

The interception Activator is a computer based system 1 (see FIG. 2) with an operator display or laptop 7 and a Subscriber Data Base 6 for generating a special access signal for enabling registration of a cell phone. The activator unit includes a modulator and demodulator for the data and an interface to the connection of the receiver/transmitter. An operating system such as DOS 6.2 or Windows NT is used.

The Subscriber Data consist of: name, address, IMSI, IMEI-numbers, and subscriber phone number. In the overview menu all the current intercepting subscribers are listed with subscribers data information: name, address, IMSI, IMEI—numbers, subscriber phone numbers, cell location, telephone number of the called party. By clicking an icon on/off the interception procedure can be activated or deactivated via an A- interface for MSC (2) connection (see FIGS. 2, 4) or Um-(RF) interface 11 (i.e. RF simulator)(see FIG. 3) for direct activation.

Figure 2:
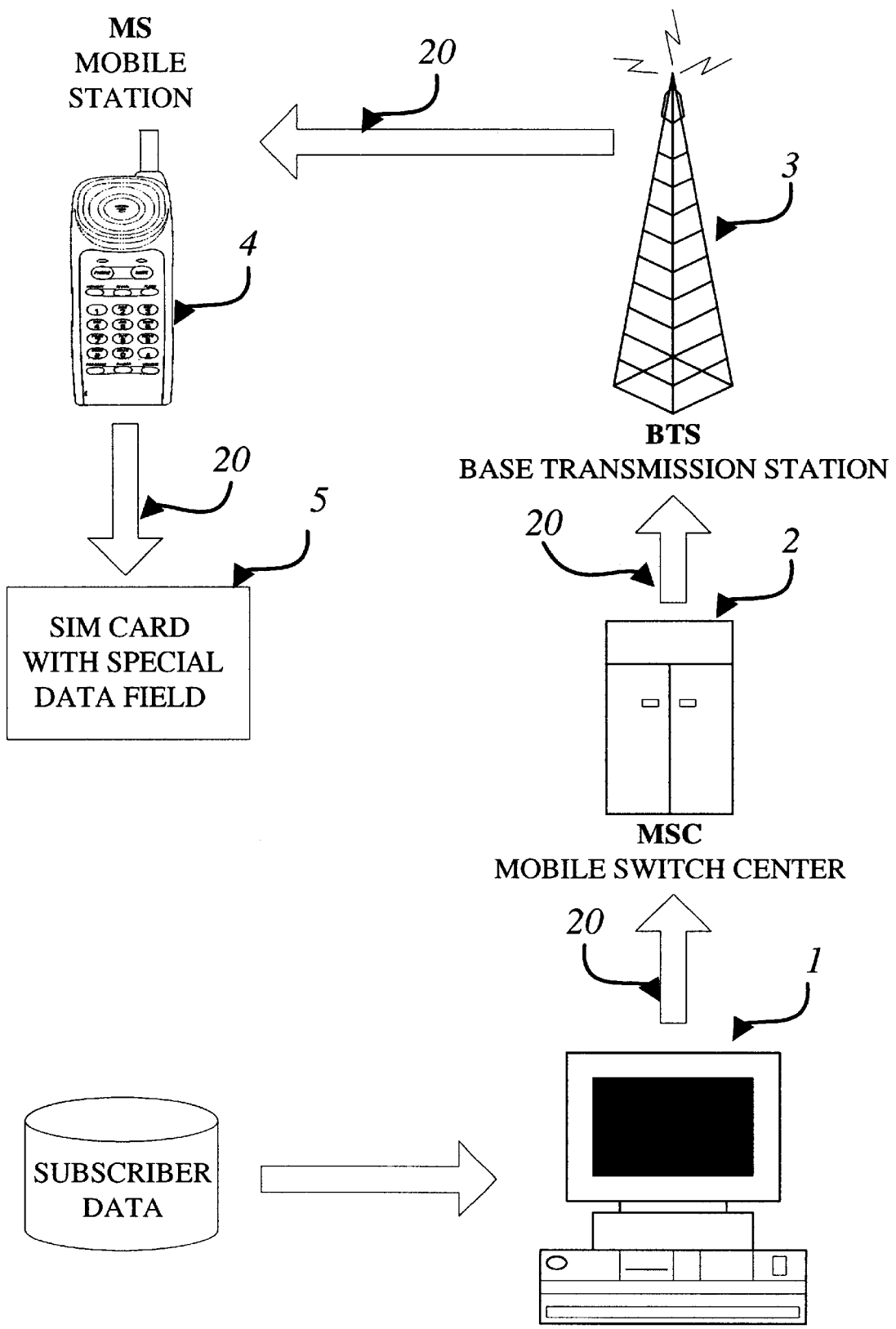
FIG. 2 is a system diagram of an embodiment of the instant invention illustrating an over the air interception activation procedure. The Activator communicates with the target cellular phone and activates or deactivates the interception procedure.
Figure 3:
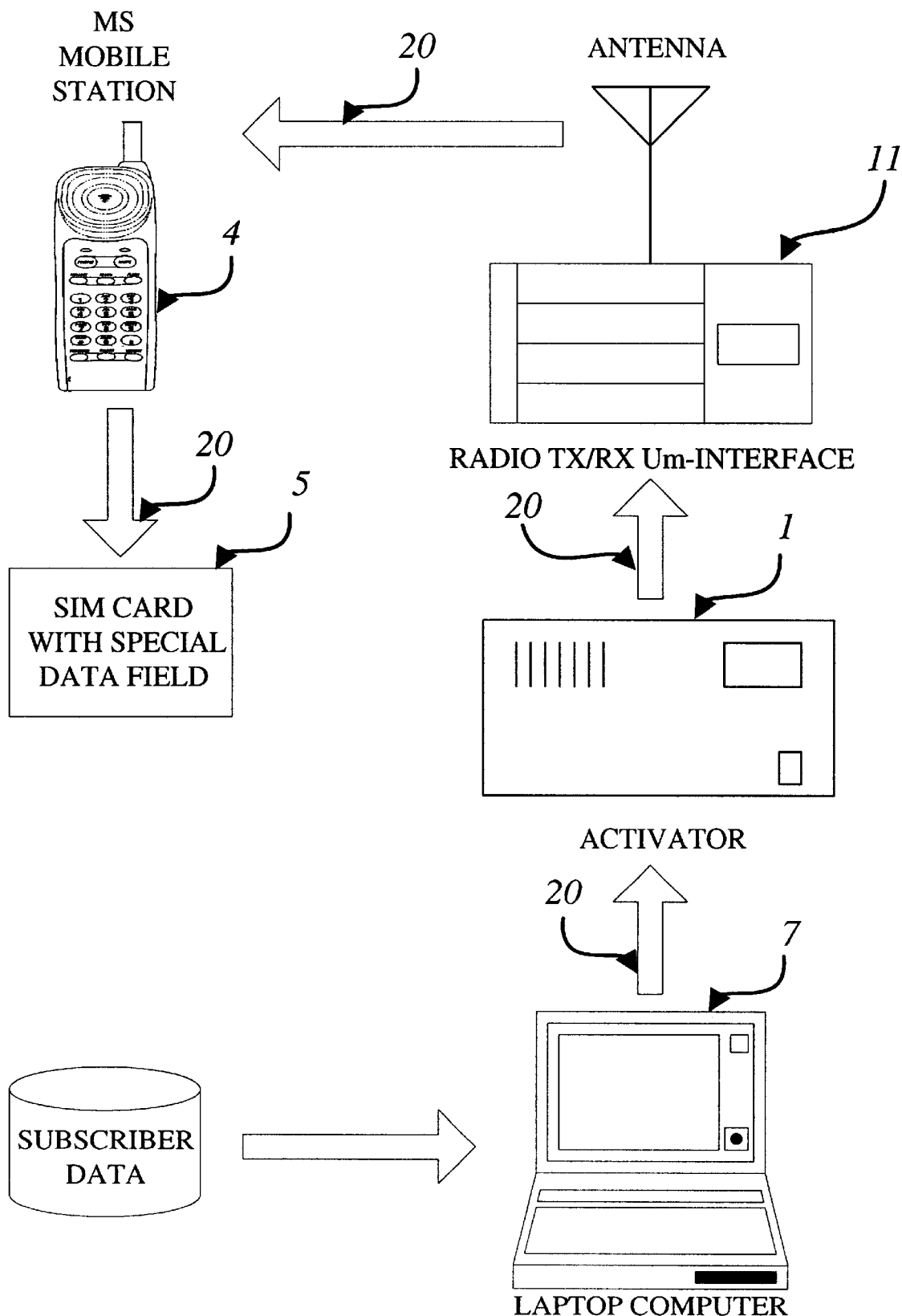
FIG. 3 is a system diagram of an embodiment of the instant invention illustrating an over the air interception activation/deactivation procedure using a mobile based system.

Referring to FIG. 2 and FIG. 3, an Activator 1 (by using Subscriber Data 6) is able to communicate with individual remote cellular phone subscribers 4 and establishes telecommunication airlinks over interface 11 (see FIG. 3), or a wire link via the MSC physical network 2 (see FIG. 2), and downloads in the SIM card 5 via a Short Message dedicated phone number/numbers to the appropriated Special Data Field in the SIM. The SIM card 5 includes memory for storing this data and software which functions to retrieve the data and initiate a phone call (i.e. commence conference call or call forwarding). After the SIM card 5 has received and stored the Short Message in the memory, it starts to perform the interception procedure. SIM card 5 then modifies every incoming and outgoing call as a "conference call" or "call forwarding", as shown in FIGS. 4–5.

The indirect activation procedure for enabling interception of communications between the cell phone 4 and an intended recipient is shown in FIG. 2. Referring to FIG. 2, activator unit 1 comprises a computer based system for initiating activation and registration of cell phones with the cellular network by generating a bit stream of service messages and messages associated with activation of a cellular phone comprising a short burst of data transmitted to MSC 2, as is conventional practice for activating a cellular telephone. The activator unit 1, however, in the present invention, is adapted to transmit an additional message 20 as part of the activation message to the MSC 2 to include the following information: 1) interception enable/disable flag; 2) third party telephone number data; and 3) "call forward" or "conference call" command. The MSC via the cellular communication network sends this information via conventional channels (e.g. via base station 3) to the cellular phone 4, which downloads the data onto SIM card 5 having memory for storing the additional message data from activator unit 1. In this manner, when the cellular telephone 4 is operated to communicate with an intended recipient such as destination telephone 9 (see FIGS. 4 and 5), the electronics within phone 4 activates the SIM card 5, which then retrieves from memory the additional message data to determine if the interception activation flag is enabled. If interception is disabled, communications between the cellular telephone 4 and the intended recipient destination telephone 9 is established in conventional fashion. If however, interception is enabled, the telephone number associated with the third party (i.e., the intercepting or listening party) is retrieved from memory and the cellular telephone in response to the SIM card initiates a call to the third party number to establish communications over the cellular network. Depending on the command stored in memory on the SIM card, either a "call forward" or "conference call" mode is entered for initiating the communication to the third party telephone number. Such communications occurs for interception of cell phone communications for either incoming or outgoing phone calls.

Figure 4:
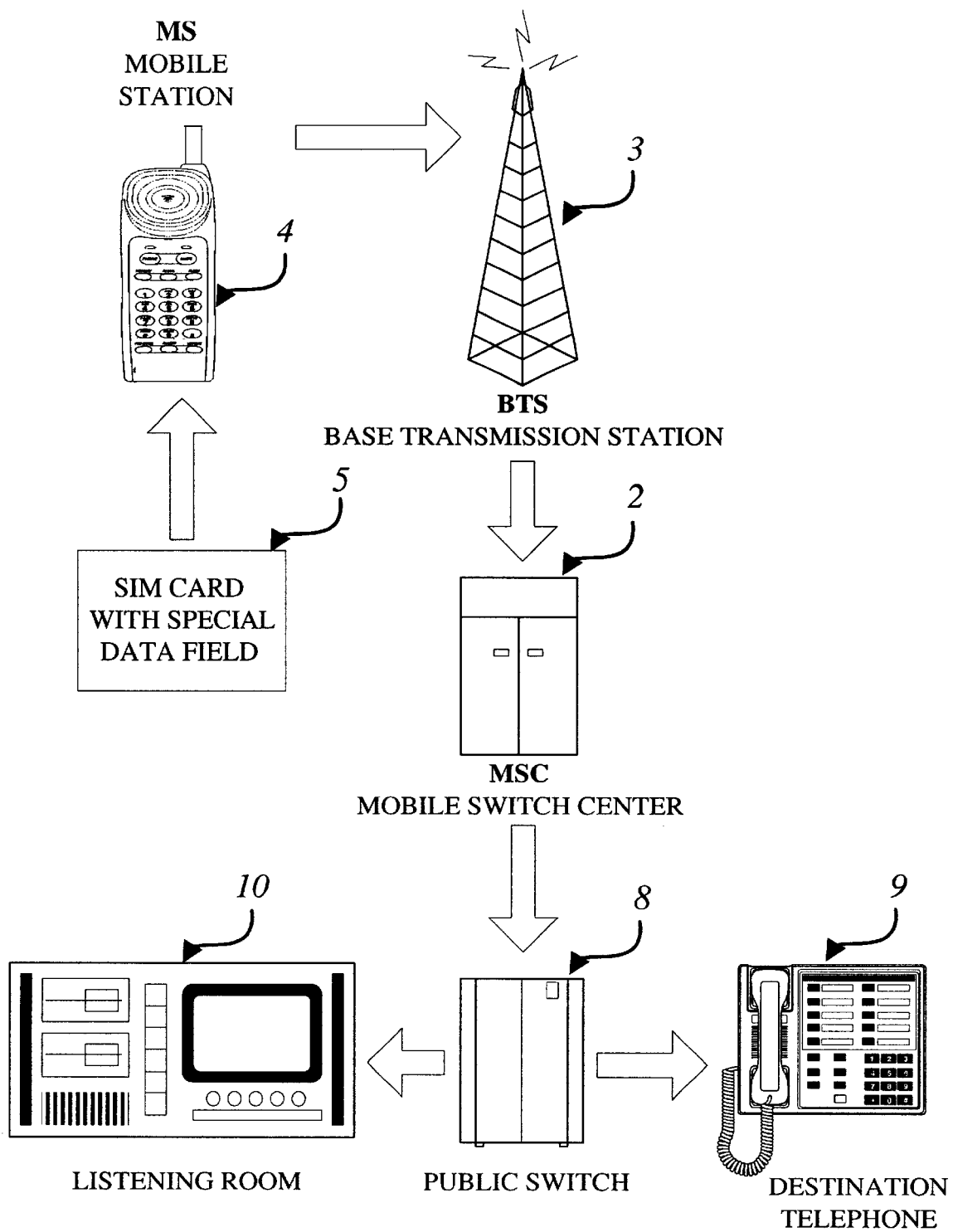
FIG. 4 is a system diagram of an embodiment of the instant invention illustrating the interception procedure off the Mobile Switch Center (MSC). The target phone is communicating with a destination phone in a "conference call" mode originated by the activated SIM card.
Figure 5:
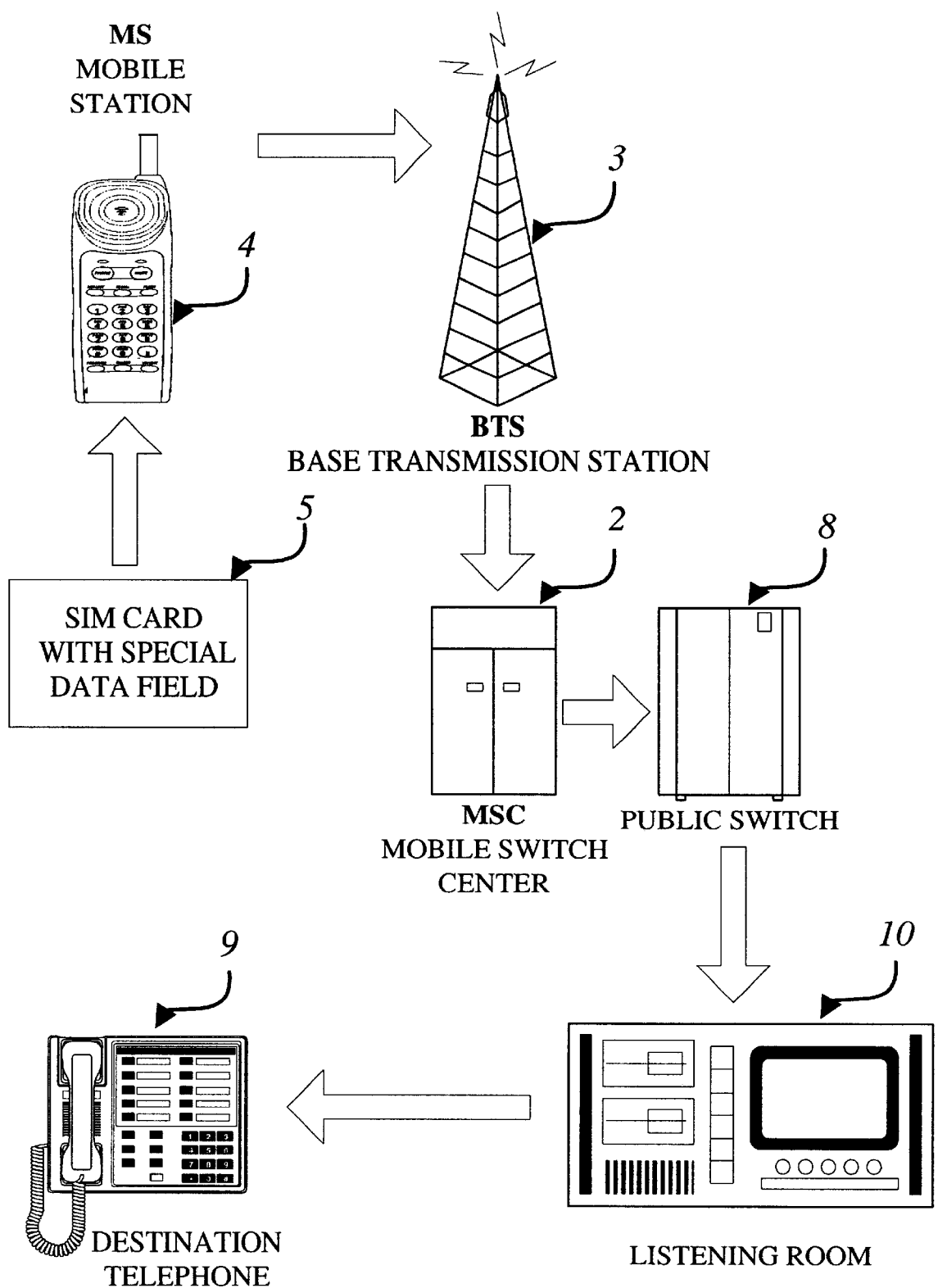
FIG. 5 is a system diagram of an embodiment of the instant invention illustrating interception procedure off the Public Switch. The target phone is communicating with the destination phone in a "call forwarding" mode which is set up by the activated SIM card.

The direct activation procedure, shown in FIG. 4, is based on a simulated mobile "host base station" 11 which simulates an RF interface to cellular phone 4 and which is operative to create a stronger control channel signal than any surrounding cell. As per conventional cellular phone technology, generation of a control channel signal stronger than any of the surrounding cells permits the cell phone 4 to connect to the source of the strongest channel for registration. That is, as soon as the target phone 4 which is within a 50–100 m radius from the direct activated unit receives this strong signal from the "host control channel" of simulator 11, it starts to perform a registration procedure with the "host base station" (i.e. simulator), which is in communication with interception activator 1. The simulator 11 comprising an antenna, receiver, transmitter and an interface to activator 1 (such as RS 232), is essentially a mobile base station which operates to provide a sufficiently strong signal to the target phone 4 to induce phone 4 to believe it has moved into a new cellular region and must now register with the new "base station". The activator unit is preferably located with the mobile simulator 11. Such registration is then performed as in conventional cellular communications. As part of the registration procedure however, the activator 1 sends a data stream to RF simulator 11 which downloads the short message data 20 via the interface simulator 11 onto target phone 4, to the SIM card 5 to activate (or deactivate) the interception procedure. During the registration, the Activator will provide the following information to the target phone: Determination of the International Mobile Subscriber Identity (IMSI)

Determination of the International Mobile Equipment Identity (IMEI)

Call to target phone for verification. As previously mentioned, a portion of the registration process will include the short message which comprises a first data portion corresponding to a predetermined "listening post" telephone number, and a second portion indicative of a call forward or conference call command, and a third portion corresponding to enablement or disablement of the interception procedure. The call forward command operates such that a call from the user of cellular phone 4 to an intended destination phone number 9 is instead routed to the phone number corresponding to the predetermined "listening post" telephone number 10 as shown in FIG. 5. In call forward mode, the listening post may then route the call to the intended destination 10. In conference call mode, each call from the user of cellular phone 4 to an intended destination phone number 9 is permitted to arrive at the destination phone 9 and then a second telephone call is placed to the phone number corresponding to the predetermined "listening post" telephone number 10 as shown in FIG. 4. The interception activator 1 as shown in FIGS. 3–4 is using only for a short period of the time (sending a Short Message to target cellular phone 4—SIM card 5) for activating or deactivating the interception procedure.

After activation, the target cellular telephone continuously will modify every call as a "conference call", as per FIG. 4 or "call forwarding", as per FIG. 5 to the dedicated phone number or numbers until the interception procedure is deactivated by the Activator system 1.

The "call forwarding" procedure has a number of special features:

Blocking one or more target phones

Controlling and modification of the information which is passing the Activator

Creating a false connection between target cellular telephone or destination telephone and listening room.

The instant invention has been shown and described herein in what is considered to be the most practical and performed embodiments.

What is claimed is:

1. An interception system, comprising:

a cellular phone including registration identification means capable of remote communication via a cellular network connected to an activating interception device;

said activating interception device operable for transmitting an activation message to said cellular phone including registration identification means for activating said cellular phone interception procedure;

said activation message including information rerouting remote communication through at least one listening point or at least one intercepting phone such that initiation of remote communications by said cellular phone including registration identification means with an intended recipient causes transmission of said remote cellular communication through at least one said listening point or at least one said intercepting phone.

2. The system according to claim 1, wherein said cellular network comprises a digital cellular network.

3. The system according to claim 2, wherein said digital cellular network includes a base station and a mobile switching center.

4. The system according to claim 2, wherein said digital cellular network includes a direct link between said activating device and said cellular phone via a radio frequency transmitter and receiver interface.

5. The system according to claim 1, wherein said identification means includes a Subscriber Identity Module (SIM) smart card.

6. The system according to claim 1, wherein said activating device includes manual means for initiating said activation message to said registration identification means for enabling or disabling interception.

7. A method for intercepting communication between a cellular phone and an intended recipient over a communication network, said method comprising:

registering said cellular phone with said communication network;

said registered cellular phone transmitting a message to said cellular communication network including a portion of said message connecting to at least one listening point or at least one intercepting phone and a portion of said message indicative of an activation signal enabling interception;

storing said message corresponding to at least one said listening point or at least one said intercepting phone and said activation signal in memory within said cellular phone;

initiating communication at said cellular phone to said intended recipient over said communication network through at least one said listening point or at least one said intercepting phone;

checking said second portion of said message in memory to determine whether said interception is enabled;

retrieving from memory said portion of identification means associated with at least one said listening point or at least one said intercepting phone and utilizing at least one said listening point or at least one said intercepting phone to establish communication between said cellular phone and said intended recipient phone number.

8. The method according to claim 7, further comprising the step of disabling said interception by sending a message as part of said registration process wherein said second portion of said message is indicative of an activation signal disabling interception.

9. The method according claim 7, wherein the step of utilizing at least one said listening point or at least one said intercepting phone to establish communication between said cellular phone to an interceptor through at least one said listening point or at least one said intercepting phone consists of rerouting reception to at least one said listening point or at least one said intercepting phone in place of the phone number of said intended recipient's phone number.

10. The method according claim 7, wherein the step of:
utilizing at least one said listening point or at least one said intercepting phone to establish communications between said cellular phone and at least one said listening point or at least one said intercepting phone comprises establishing a conference call between the user of said cellular phone, said intended recipient phone number and at least one said listening point or at least one said intercepting phone.

11. The method according to claim 7, wherein said communications network comprised a digital cellular network.

12. The method according to claim 7, further comprising the step of providing a simulated RF interface for generating a high powered control signal to said cellular phone to cause said cellular phone to initiate registration.

13. An interception system for enabling digital cellular communication between a target cell phone and an intended recipient phone to be directed to at least one said listening point or at least one intercepting phone, said system comprising;
activation means for providing a signal indicative of a third party phone number corresponding at least one said listening point or at least one said intercepting phone;
communication means responsive to said signal for transmitting said third party phone number to said target cell phone;
memory means for storing said third party phone number; and
means responsive to a communication signal indicative of a request to establish communication with said intended recipient phone for retrieving said third party phone number and initiating communication to at least one said listening point or at least one said intercepting phone.

14. The interception system according to claim 13, wherein said communication means comprises a direct communications link.

15. The interception system according to claim 13, wherein said communication means comprises an indirect communications link.

16. The interception system according to claim 14, wherein said direct communications link comprises an RF simulator coupled to an activator and said target phone.

17. The interception system according to claim 15, wherein said indirect communications link comprises an MCS and base station coupled between an activator and said target phone.

18. The interception system according to claim 16, wherein said RF simulator and activator are a mobile unit.

19. The interception system according to claim 13, wherein said activation means further provides a second signal indicative of a call forward mode or a conference call mode associated with said target phone.

20. The interception system according to claim 13, wherein said signal from said activation means is provided during registration of said target cellular phone with a cellular network.

\* \* \* \* \*